US006722189B2

(12) United States Patent
Fabre

(10) Patent No.: US 6,722,189 B2
(45) Date of Patent: Apr. 20, 2004

(54) LEAK DETECTION IN A CLOSED VAPOR HANDLING SYSTEM USING A PRESSURE SWITCH AND TIME

(75) Inventor: Laurent Fabre, Portet sur Garonne (FR)

(73) Assignee: Siemens Automotive S.A., Toulouse (FR)

(*) Notice: Subject to any disclaimer, the term of this patent is extended or adjusted under 35 U.S.C. 154(b) by 241 days.

(21) Appl. No.: 09/789,449

(22) Filed: Feb. 21, 2001

(65) Prior Publication Data

US 2001/0022173 A1 Sep. 20, 2001

Related U.S. Application Data

(60) Provisional application No. 60/184,193, filed on Feb. 22, 2000.

(51) Int. Cl.$^7$ .............................................. G01M 15/00

(52) U.S. Cl. ........................................................ 73/116

(58) Field of Search ......................... 73/40, 49.7, 118.1, 73/116, 117.3, 118.2; 123/520, 519, 518, 516, 198, 406.27, 406.36, 436, 476, 568.16, 117.2

(56) References Cited

U.S. PATENT DOCUMENTS

| | | | | |
|---|---|---|---|---|
| RE32,157 E | * | 5/1986 | Waugh et al. | 73/3 |
| 5,143,035 A | | 9/1992 | Kayanuma | 123/198 |
| 5,263,462 A | | 11/1993 | Reddy | 123/520 |
| 5,295,472 A | * | 3/1994 | Otsuka et al. | 123/520 |
| 5,398,661 A | | 3/1995 | Denz et al. | 123/520 |
| 5,490,414 A | | 2/1996 | Durschmidt et al. | 73/49.2 |
| 5,744,701 A | | 4/1998 | Peterson et al. | 73/49.2 |
| 5,750,888 A | | 5/1998 | Matsumoto et al. | 73/118.1 |
| 5,957,115 A | | 9/1999 | Busato et al. | 123/520 |
| 5,967,124 A | * | 10/1999 | Cook et al. | 123/520 |
| 5,988,206 A | | 11/1999 | Bare et al. | 137/354 |
| 6,073,487 A | | 6/2000 | Dawson | 73/118.1 |
| 6,089,081 A | | 7/2000 | Cook et al. | 73/118.1 |
| 6,158,270 A | | 12/2000 | Garman et al. | 73/40.7 |
| 6,164,123 A | | 12/2000 | Corkill | 73/49.7 |
| 6,182,642 B1 | | 2/2001 | Ohkuma | 123/520 |

FOREIGN PATENT DOCUMENTS

| | | |
|---|---|---|
| EP | 0 598 176 | 3/1994 |
| EP | 0 611 674 | 8/1994 |
| EP | 0 952 332 | 10/1999 |
| FR | 2 732 072 | 9/1996 |
| WO | WO 99/18419 | 4/1999 |
| WO | WO 99/37905 | 7/1999 |

OTHER PUBLICATIONS

International Search Report for Application No. PCT/CA01/00225; Jun. 11, 2001.
International Search Report for Application No. PCT/CA01/000224, Jun. 11, 2001.

* cited by examiner

*Primary Examiner*—Evan Pert
*Assistant Examiner*—Monica D. Harrison
(74) *Attorney, Agent, or Firm*—Siemens Corporation

(57) ABSTRACT

A method of leak detection in a closed vapor handling system of an automotive vehicle, wherein an engine is shut off, implemented by a system, the method including providing pressure switch and a time counter, closing a shut off valve, waiting for a no test delay, evaluating whether the pressure switch is closed, incrementing the time counter if the pressure switch is open and comparing the time counter to a time control value if the pressure switch is open. The system includes a pressure switch, a shut off valve and a processor operatively coupled to the pressure switch and the shut off valve. The processor receives pressure signals from the pressure switch and sends signals to the shut off valve, wherein the processor closes the shut off valve, waits for a no test delay, determines whether the pressure switch is closed, increments a time counter and compares the time counter to a time control value.

20 Claims, 2 Drawing Sheets

LEAK DETECTION IN A CLOSED VAPOR HANDLING SYSTEM USING A PRESSURE SWITCH AND TIME

REFERENCE TO RELATED APPLICATION

This application expressly claims the benefit of the earlier filing date and right of priority from the following patent application: U.S. Provisional Application Ser. No. 60/184, 193, filed on Feb. 22, 2000 in the name of Laurent Fabre and Pierre Calvairac and entitled “Vacuum Detection.” The entirety of that earlier filed co-pending provisional patent application is expressly incorporated herein by reference.

FIELD OF INVENTION

This invention relates to leak detection methods and systems, and more particularly, to automotive fuel leak detection using a pressure switch and time.

BACKGROUND OF INVENTION

In a vapor handling system for a vehicle, fuel vapor that escapes from a fuel tank is stored in a canister. If there is a leak in the fuel tank, the canister, or any other component of the vapor handling system, fuel vapor could exit through the leak to escape into the atmosphere.

Vapor leakage may be detected through evaporative monitoring. This evaporative monitoring may be performed while an engine is running, where pressure decrease may be analyzed. This type of evaporative monitoring may detect 1 mm and larger leaks, however, it is believed that many parameters influence the accuracy of the diagnosis. Therefore, it is believed that evaporative monitoring when the engine is off is more reliable.

SUMMARY OF THE INVENTION

The present invention provides a method of leak detection in a closed vapor handling system of an automotive vehicle, wherein an engine is shut off. The method includes providing pressure switch and a time counter, closing a shut off valve, waiting for a no test delay, evaluating whether the pressure switch is closed, incrementing the time counter if the pressure switch is open, and comparing the time counter to a time control value if the pressure switch is open.

The present invention also provides another method of leak detection in a closed vapor handling system of an automotive vehicle, wherein an engine is shut off. This method includes providing a pressure switch and an engine management system to receive pressure signals from the pressure switch, determining whether the engine is off, closing a shut off valve, opening a control valve, generating a vacuum within a monitoring period, evaluating whether the pressure switch is closed, setting the time counter to zero if the pressure switch is closed, incrementing a time counter if the pressure switch is open, comparing the time counter to a time control value if the pressure switch is open, determining a no leak condition if the time counter does not exceed the time control value, and determining a leak condition if the time counter exceeds the time control value.

The present invention also provides an automotive evaporative leak detection system. The system includes a pressure switch, a shut off valve and a processor operatively coupled to the pressure switch and the shut off valve and receiving pressure signals from the pressure switch and sending signals to the shut off valve. The processor closes a shut off valve, waits for a no test delay, evaluates whether the pressure switch is closed, increments a time counter and compares the time counter to a time control value.

The present invention further provides another automotive evaporative leak detection system. This system includes a pressure switch located on a conduit between a fuel tank and a canister, a shut off valve located between the canister and an atmosphere, a control valve located between the canister and the engine, and a processor operatively coupled to the shut-off valve, the control valve, and the pressure switch and receiving pressure signals from the pressure switch and sending signals to the shut off valve and the control valve. The canister communicates with the atmosphere, and the fuel tank communicates with an engine. The processor opens and closes the shut off valve and the control valve, generates a vacuum within a monitoring period, evaluates whether the pressure switch is closed, increments a time counter and compares the time counter to a time control value.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention.

DETAILED DESCRIPTION OF THE PREFERRED EMBODIMENT

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical automotive vehicles and vapor handling systems.

Figure 1:
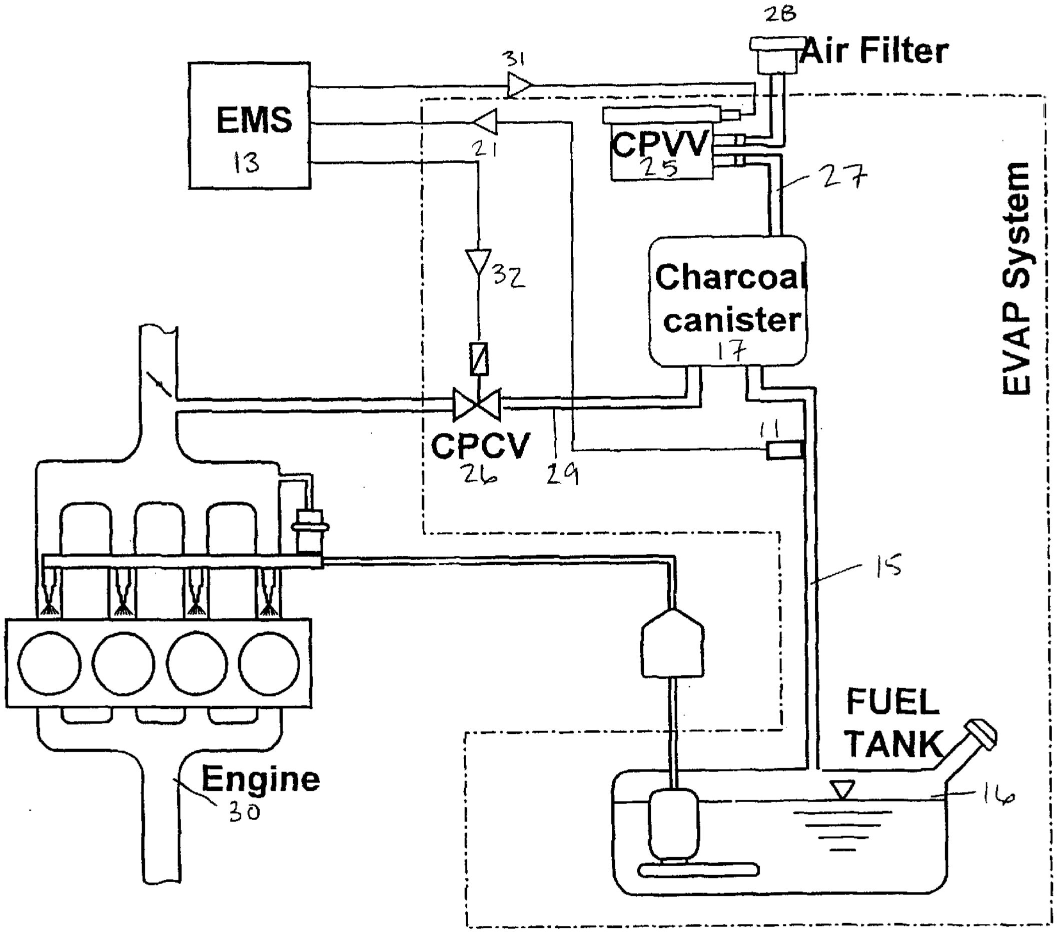
FIG. 1 is a schematic view of a preferred embodiment of the system of the present invention.

As shown in FIG. 1, an evaporative leak detection system 10 in an automotive vehicle includes a pressure switch 11, a shut off valve 25, and a processor 13. Preferably, the pressure switch 11 is located on a conduit 15 between a fuel tank 16 and a canister 17 and is in fluid communication with vapor in the fuel tank 16. The canister 17 is also in communication with the fuel tank 16, an atmosphere 28, and an engine 30. The pressure switch 11, preferably, moves at different relative vacuums having a low vacuum threshold for small leak detection of about 0.5 mm and a high vacuum threshold for large leak detection of about 1 mm. The shut off valve 25, or preferably, a canister purge vent valve, is located on a conduit 27 between the canister 17 and the atmosphere 28. The shut off valve 25 is normally open. Closing the shut off valve 26 hermetically seals the system 10 from the atmosphere 28.

The system 10 may also include a control valve 26, which may be a canister purge control valve or an evaporative emission control valve. The control valve 26 is located on a conduit 29 between the canister 17 and the engine 30. The engine 30 communicates with the fuel tank 16 and the canister 17. Closing the control valve 26 seals the system 10 from the engine 30. The processor 13, or engine management system, is operatively coupled to, or in communication with, the pressure switch 11, the shut off valve 25 and the control valve 26. The processor 13 receives and processes pressure signals 21 from the pressure switch 11 and sends signals 31 and 32, respectively, to open and close the valves 25 and 26, respectively. The processor 13 can either include the necessary memory or clock or be coupled to suitable circuits that implement the communication. The processor 13 also waits for a no test delay, evaluates whether the pressure switch 11 is closed, increments a time counter, and compares the time counter to a time control value.

The system 10 implements a method of leak detection, or leak detection diagnosis, when the system determines that the engine 30 is shut off. This method may detect 0.5 mm leaks, as well as 1 mm leaks. When there is no leak, the fuel tank pressure will decrease and when there is a leak in the system 10, there will be no pressure variation in a constant volume.

Figure 2:
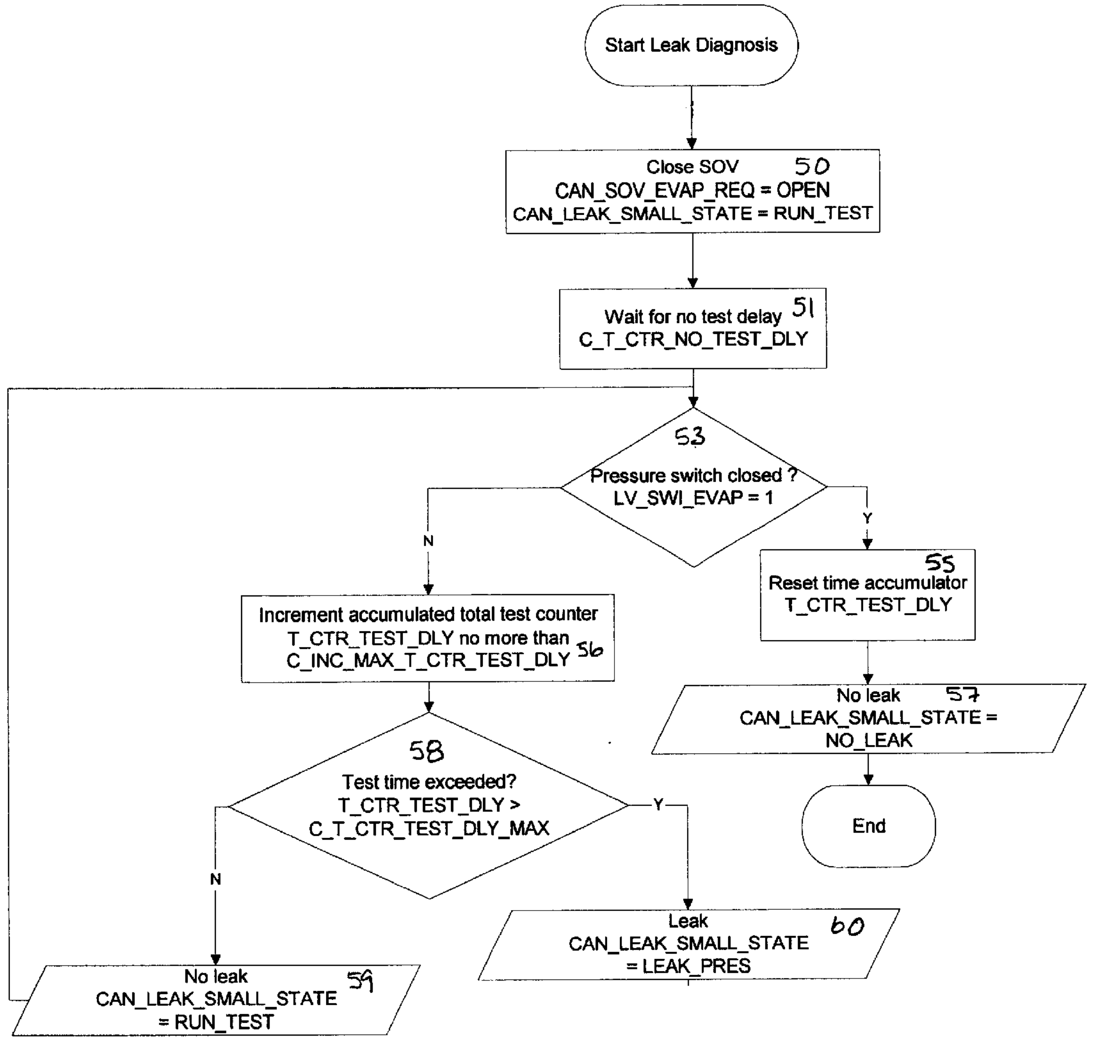
FIG. 2 is a block diagram of the preferred embodiment of the method of the present invention.

As shown in FIG. 2, when the engine is off, in step 50, the shut off valve 25 is closed. Preferably, the processor 13 sends the signal 31 to close the shut off valve 25. The system 10 will then be hermetically sealed from the engine 30 and the atmosphere 28. After the shut off valve is closed, the system waits for a no test delay in step 51. Preferably, during step 51, the processor 13 opens control valve 26 and generates a vacuum, within a monitoring period, in the system. It should be understood that the monitoring period is based on the size of the system and the time necessary to reach a threshold vacuum that indicates a leak. The control valve 26 will be closed by the processor 13 at the end of the monitoring period.

In step 53, the processor 13 evaluates whether the pressure switch is closed. If the pressure switch 11 is closed, then the time counter is reset to zero in step 55, a no leak condition is determined in step 57 and the leak detection diagnosis will end. On the other hand, if the pressure switch 11 is not closed, or open, then the processor 13 increments the time counter in step 56 and compares the time counter to a time control value in step 58. If the time counter is not greater than the time control value, then a no leak condition is determined in step 59. Preferably, the system then returns to step 53. If the time counter is greater than the time control value, then the system 10 determines a leak condition in step 60.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A method of leak detection in a closed vapor handling system of an automotive vehicle, wherein an engine is shut off, comprising:

providing pressure switch and a time counter;

closing a shut off valve;

waiting for a no test delay;

evaluating whether the pressure switch is closed;

incrementing the time counter if the pressure switch is open;

comparing the time counter to a time control value if the pressure switch is open; and determining one of a leak condition based on a position of the pressure switch and a no leak condition based on a position of the pressure switch and a value of the time counter.

2. The method of claim 1, if the pressure switch is closed, further comprising:

setting the time counter to zero; and determining a no leak condition.

3. The method of claim 1 further comprising:

determining a no leak condition if the time counter does not exceed the time control value.

4. The method of claim 1 wherein further comprising:

determining a leak condition if the time counter exceeds the time control value.

5. The method of claim 4 wherein the determining comprises:

detecting a leak of about 0.5 millimeters.

6. The method of claim 1 further comprising:

determining whether the engine is off.

7. The method of claim 1 further comprising:

providing an engine management system to receive pressure signals from the pressure switch.

8. A method of leak detection in a closed vapor handling system of an automotive vehicle, wherein an engine is shut off, comprising:

providing pressure switch and a time counter;

closing a shut off valve;

waiting for a no test delay;

evaluating whether the pressure switch is closed;

incrementing the time counter if the pressure switch is open; and comparing the time counter to a time control value if the pressure switch is open;

wherein the waiting includes:

opening a control valve; and generating a vacuum within a monitoring period.

9. The method of claim 8 wherein the opening comprises:

providing an evaporative emission control valve.

10. The method of claim 1 wherein the closing comprises:

hermetically sealing off the system from an atmosphere.

11. A method of leak detection in a closed vapor handling system of an automotive vehicle, wherein an engine is shut off, comprising:

providing pressure switch and a time counter;

closing a shut off valve;

waiting for a no test delay;

evaluating whether the pressure switch is closed;

incrementing the time counter if the pressure switch is open; and comparing the time counter to a time control value if the pressure switch is open; and moving the pressure switch at a relative vacuum.

12. A method of leak detection in a closed vapor handling system of an automotive vehicle, wherein an engine is shut off, comprising:

providing a pressure switch and an engine management system to receive pressure signals from the pressure switch;

determining whether the engine is off;

closing a shut off valve;

opening a control valve;

generating a vacuum within a monitoring period;

evaluating whether the pressure switch is closed;

setting the time counter to zero if the pressure switch is closed;

incrementing a time counter if the pressure switch is open;

comparing the time counter to a time control value if the pressure switch is open;

determining a no leak condition if the time counter does not exceed the time control value; and determining a leak condition if the time counter exceeds the time control value.

13. An automotive evaporative leak detection system comprising:

a pressure switch;

a shut off valve; and a processor operatively coupled to the pressure switch and the shut off valve and receiving pressure signals from the pressure switch and sending signals to the shut off valve;

wherein the processor closes the shut off valve, waits for a no test delay, evaluates whether the pressure switch is closed, increments a time counter if the pressure switch is open, compares the time counter to a time control value if the pressure switch is open, and determines one of a leak condition and a no leak condition.

14. The system of claim 13 wherein the pressure switch is in fluid communication with fuel tank vapor.

15. The system of claim 13 wherein the processor is in communication with the pressure switch.

16. An automotive evaporative leak detection system comprising:

a pressure switch;

a shut off valve; and a processor operatively coupled to the pressure switch and the shut off valve and receiving pressure signals from the pressure switch and sending signals to the shut off valve;

wherein the processor closes the shut off valve, waits for a no test delay, evaluates whether the pressure switch is closed, increments a time counter if the pressure switch is open, and compares the time counter to a time control value if the pressure switch is open; and wherein the pressure switch moves at a given relative vacuum.

17. The system of claim 13 wherein the pressure switch is located on a conduit between a fuel tank and a canister.

18. An automotive evaporative leak detection system comprising:

a pressure switch;

a shut off valve;

a processor operatively coupled to the pressure switch and the shut off valve and receiving pressure signals from the pressure switch and sending signals to the shut off valve;

wherein the processor closes the shut off valve, waits for a no test delay, evaluates whether the pressure switch is closed, increments a time counter if the pressure switch is open, and compares the time counter to a time control value if the pressure switch is open; and wherein the processor opens a control valve and generates a vacuum within a monitoring period.

19. An automotive evaporative leak detection system comprising:

a pressure switch;

a shut off valve;

a processor operatively coupled to the pressure switch and the shut off valve and receiving pressure signals from the pressure switch and sending signals to the shut off valve;

wherein the processor closes the shut off valve, waits for a no test delay, evaluates whether the pressure switch is closed, increments a time counter if the pressure switch is open, and compares the time counter to a time control value if the pressure switch is open;

a fuel tank communicating with an engine;

a canister communicating with the fuel tank, the engine and an atmosphere, the pressure switch located between the canister and the fuel tank, the shut off valve located between the canister and the atmosphere; and a control value operatively coupled to the processor and located between the canister and the engine;

wherein the processor opens and closes the shut off valve and the control valve.

20. An automotive evaporative leak detection system comprising:

a pressure switch located on a conduit between a fuel tank and a canister, the canister communicating with an atmosphere, the fuel tank communicating with an engine;

a shut off valve located between the canister and the atmosphere;

a control valve located between the canister and the engine; and a processor operatively coupled to the shut off valve, the control valve, and the pressure switch, the processor receiving pressure signals from the pressure switch and sending signals to the shut off valve and the control valve;

wherein the processor opens and closes the shut off valve and the control valve, generates a vacuum within a monitoring period, evaluates whether the pressure switch is closed, increments a time counter if the pressure switch is open, compares the time counter to a time control value if the pressure switch is open, and determines one of a leak condition and a no leak condition.

* * * * *